United States Patent [19]

Stidham

[11] Patent Number: 4,533,276

[45] Date of Patent: Aug. 6, 1985

[54] SWIVEL

[75] Inventor: Mark A. Stidham, Rockford, Ill.

[73] Assignee: Atwood Vacuum Machine Company, Rockford, Ill.

[21] Appl. No.: 630,859

[22] Filed: Jul. 13, 1984

[51] Int. Cl.³ .............................................. F16D 1/12
[52] U.S. Cl. .................................. 403/165; 74/501 R
[58] Field of Search ........................ 403/164, 165, 78; 74/501 R

[56] References Cited

U.S. PATENT DOCUMENTS

| | | | |
|---|---|---|---|
| 2,499,649 | 3/1950 | Kashergen | 403/165 |
| 2,574,397 | 11/1951 | King | 74/501 D |
| 2,617,464 | 11/1952 | Trumbull | 403/78 X |
| 4,266,439 | 5/1981 | Hayashi et al. | 74/501 D |
| 4,366,725 | 1/1983 | Kondo | 74/501 R |

FOREIGN PATENT DOCUMENTS 650707  10/1962  Canada ............................ 74/501 R Primary Examiner—Andrew V. Kundrat
Attorney, Agent, or Firm—Leydig, Voit, Osann, Mayer & Holt, Ltd.

[57] ABSTRACT

A swivel for connecting a cable to a lever of a parking brake release mechanism is made as a unitary sheet metal stamping having a flat body portion, an end flange projecting laterally from one end of the body portion and parallel side flanges projecting laterally from the side edges of the body portion with the side flanges merging with the side edges of the end flange. The end flange is perpendicular to the body portion and each side flange is perpendicular both to the body portion and to the end flange. The opposite end of the body portion is pivotally connected to the lever and an enlarged head on the end of the cable is inserted through a window in the body portion and then the cable is moved through a slot in the body portion to a connecting slot in the end flange so that the head on the cable bears against the end flange.

3 Claims, 3 Drawing Figures

SWIVEL

BACKGROUND OF THE INVENTION

This invention relates to a swivel of the type which connects a flexible cable and a member that turns such a lever of a brake release mechanism. More particularly, the invention relates to a swivel in which a force is transmitted from and to the cable in a direction which is longitudinal of the cable.

SUMMARY OF THE INVENTION

The general object of the invention is to provide a new and improved swivel of the above type which, as compared to prior swivels, is stronger and less likely to fail in service use and which, at the same time, is inexpensive to fabricate and comparatively easy to assemble with the cable.

A more detailed object is to form the swivel as an open-sided unitary piece with a flat body portion, an end flange for connection to the cable and longitudinally extending side flanges merging with the sides of the end flange.

The invention also resides in an arrangement of openings in the body portion and the end flange to permit easy and secure connection of the cable to the swivel.

DETAILED DESCRIPTION OF THE PREFERRED EMBODIMENT

Figure 1:
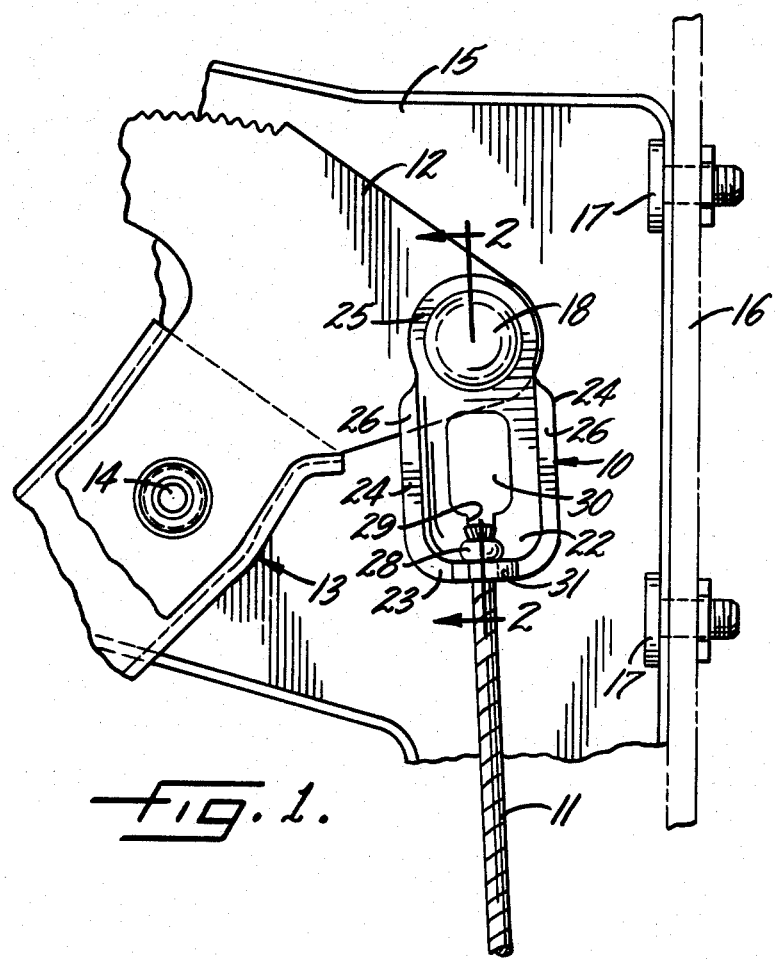
FIG. 1 is a front fragmentary elevational view of a parking brake release mechanism utilizing a swivel embodying the present invention.

As shown in the drawings for purposes of illustration, the invention is embodied in a swivel 10 for connecting a flexible cable 11 to a lever 12 of a parking brake release mechanism 13. The lever turns on a pivot shaft 14 which is mounted on a bracket 15 secured to a stationary part 16 of an automobile by bolts 17 and the lever is turned to set the parking brake by pulling the cable 11. The swivel is connected to the lever 12 by a pivot 18 in the form of a rivet which projects through a hole 19 (FIGS. 2 and 3) in the swivel adjacent one end thereof and through a hole 20 in the lever and the end 21 of the rivet is upset behind the lever. As is conventional in such an arrangement, the pivot permits the swivel to remain longitudinally aligned with the cable as the lever is turned.

The present invention contemplates the provision of a new and improved swivel 10 which, as compared to prior swivels, is stronger and less likely to fail in service use and which, at the same time, is less expensive to manufacture. In addition, the swivel is comparatively easy to assemble with the cable 11. To these ends, the swivel is made as a rigid unitary piece which comprises an elongated flat body portion 22 in which the hole 19 is formed adjacent one of its ends and a laterally projecting end flange 23 is formed at the other end of the body portion to be connected to the cable 11 and the swivel further includes side flanges 24 projecting laterally from the side edges of the body portion and merging with the edges of the end flange. Thus, the swivel is, in effect, open faced whereby it can be fabricated by simple, progressive stamping operations. On the other hand, the side flanges not only give the swivel strength in the longitudinal direction but also substantially reduce the possibility of either the body portion or the end flange bending or otherwise becoming distorted.

Figure 2:
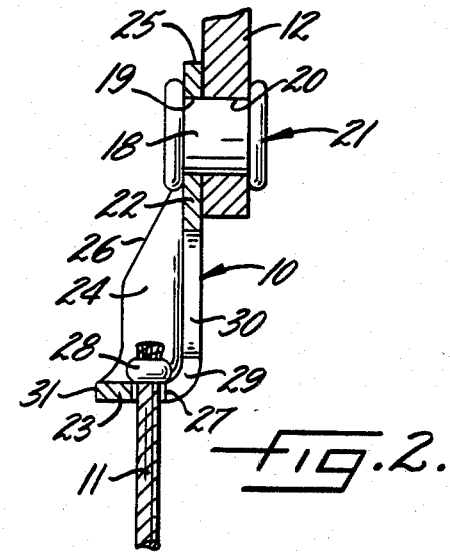
FIG. 2 is a sectional view taken along line 2—2 in FIG. 1.
Figure 3:
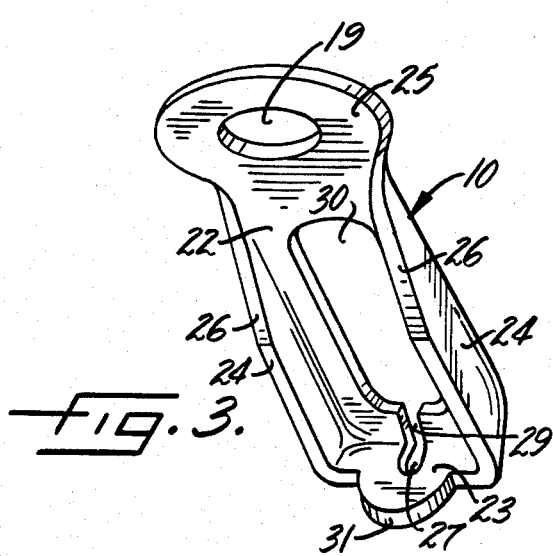
FIG. 3 is a perspective view of the swivel.

In the form shown in the drawings, the body portion 22 is flat and generally rectangular with an enlarged and rounded upper end portion 25 encircling the hole 19. The end flange 23 projects forwardly from the lower end of the body portion and lies in a plane perpendicular to the plane of the body portion. The side flanges 24 also project forwardly from the body portion, that is, they are on the same side of the latter as the end flange, and the side flanges lie in individual planes which are parallel to each other and which also are perpendicular to the planes of both the body portion and the end flange of the swivel. As shown in FIGS. 2 and 3, each side flange 24 is generally in the shape of a right triangle with the base emerging with the edge of the end flange and the upright leg merging with the associated side edge of the body portion. The base of each side flange is substantially coextensive with the side of the end flange and the edge 26 which forms the hypotenuse of the side flange is inclined inwardly toward the body portion to merge with the latter at the start of the upper portion 25.

To connect the swivel 10 and the cable 11, the invention also contemplates the use of an arrangement of openings in the body portion 22 and the end flange 23. Thus, the cable is received in a slot 27 in the end flange and is provided with an enlarged head which bears against the upper side of the end flange so that the head draws the swivel downwardly when the cable is pulled down while the swivel pulls the cable upwardly when the lever 12 is turned counterclockwise. The width of the slot is greater than the diameter of the cable but substantially less than the diameter of the head. In order to permit quick and easy assembly of the cable and the swivel, the slot 27 is perpendicular to the plane of the body portion 22 and communicates with a longitudinal slot 29 in the latter and the slot 29, in turn, communicates with a larger hole or window 30 in the central part of the body portion. The window 30 is appreciably larger than the head 28 so that the latter may easily be inserted through the window and the slot 29, like the slot 27, is narrower than the head but wider than the cable. The slot 27 terminates at a point into the end flange 23 at which the head is completely clear of the body portion 22 as shown in FIG. 2 and, to provide sufficient strength at the end of this slot, a rounded extension or ear 31 is formed on the free edge of the end flange.

With the foregoing arrangement, the cable 11 is connected to the swivel 10 by first inserting the head 28 through the window 30 from the back or the right as viewed in FIG. 2. Then, while keeping the head in front of the body portion 22, the cable is advanced through the slot 29 and into the slot 27 to the forward end thereof to complete the assembly. When the cable is pulled to turn the lever 12 clockwise as viewed in FIG. 1, the force is applied to the cable is transmitted longitudinally through the swivel to the lever. Similarly, the force returning the lever to its original position is transmitted longitudinally through the swivel from the lever to the cable. Because of the side flanges 24, the swivel is capable of transmitting these longitudinal forces without being deformed. At the same time, the swivel is easily fabricated as by being stamped from sheet metal.

I claim:

1. A swivel adapted to connect a turning member to an elongated element which is movable endwise and which has a head on its free end, said swivel being a rigid unitary sheet metal stamping and comprising, an elongated flat body portion, a hole formed through said body portion adjacent one end thereof for attaching said swivel to said turning member, an end flange projecting laterally from said body portion at the other end thereof, a pair of spaced side flanges, one projecting laterally from each side of said body portion and each merging with a side of said end flange, a window wider than the head on said elongated element and formed through said body portion adjacent the center thereof, a first slot formed through said body portion and extending longitudinally of the latter from said window to said end flange, and a second slot formed in said end flange and communicating with said first slot, said second slot having a closed end located adjacent the center of said end flange, and both of said slots being narrower than said head but wider than said element whereby the head may be inserted through said window and said element may be moved through said first slot to the closed end of said second slot.

2. A swivel for connecting a turning member to an elongated element which is movable endwise and which has an enlarged head on its free end, said swivel being a rigid and unitary sheet metal stamping and comprising an elongated body portion having first and second substantially flat faces disposed in generally parallel planes, a pivot hole extending between said faces adjacent one end of said body portion and sized to receive means for pivotally attaching said swivel to said turning member, an end flange projecting laterally from one face of said body portion at the other end thereof and being disposed substantially perpendicular to said one face, a pair of spaced side flanges projecting laterally from said one face of said body portion adjacent opposite sides thereof and extending from said body portion in the same direction as said end flange, each of said side flanges merging with and being joined to a side of said end flange and each being substantially perpendicular to said end flange and to said one face of said body portion, a window wider than the head on said elongated element formed through the center of said body portion and extending between the two faces of the body portion, a first slot formed through said body portion between the two faces thereof, said first slot communicating with said window and extending longitudinally along the body portion from said window to said end flange, a second slot formed through said end flange and extending substantially perpendicular to said first slot, said second slot having an open end communicating with said first slot and having an opposite closed end located adjacent the center of said end flange, and both of said slots being narrower than said head but wider than said element whereby the head may be inserted laterally through said window and said element may be moved laterally through said first slot to the closed end of said second slot and then may be moved longitudinally in said second slot to position said head longitudinally beyond said window and against said end flange.

3. A swivel as defined in claim 2 in which said side flanges are in the shape of a right triangle with their bases being at said end flange and being substantially coextensive with the sides of the end flange.

* * * * *